United States Patent

[11] 3,600,015

| [72] | Inventor | Larry Gene McMullen<br>East Moline, Ill. |
|---|---|---|
| [21] | Appl. No. | 766,660 |
| [22] | Filed | Aug. 26, 1968 |
| [45] | Patented | Aug. 17, 1971 |
| [73] | Assignee | Deere & Company<br>Moline, Ill.<br>Continuation of application Ser. No.<br>625,197, Mar. 22, 1967, now abandoned. |

[54] PIVOT PIN STRUCTURE
4 Claims, 4 Drawing Figs.

[52] U.S. Cl. .................................................. 287/100
[51] Int. Cl. .................................................. F16c 11/00
[50] Field of Search .................................... 287/100,
20.3, 20 P, 52.06; 308/71

[56] References Cited
UNITED STATES PATENTS
389,480  9/1888  Massett .................. 287/52.06 X

| 2,714,422 | 8/1955 | Janiszewski | 287/20.3 X |
| 2,838,331 | 6/1958 | Coleman | 287/100 |
| 3,129,966 | 4/1964 | Blank | 287/100 |

FOREIGN PATENTS
| 586,217 | 10/1933 | Germany | 308/71 |
| R.10,439 | 1/1956 | Germany | 287/20 P |

*Primary Examiner*—Kenneth Downey
*Assistant Examiner*—Andrew V. Kundrat
*Attorneys*—H. Vincent Harsha, Harold M. Knoth, William A. Murray and John M. Nolan ABSTRACT: A pivot pin structure that includes a pivot pin having a central journal portion and opposite and integral tapered ends; split sleeves having internal frustoconical-shaped surfaces that engage the tapered ends; and a pair of plates threadedly attached to opposite ends of the pin and bearing against the ends of the sleeves for moving the sleeves axially inwardly relative to the tapered ends of the pin.

PATENTED AUG 17 1971 3,600,015
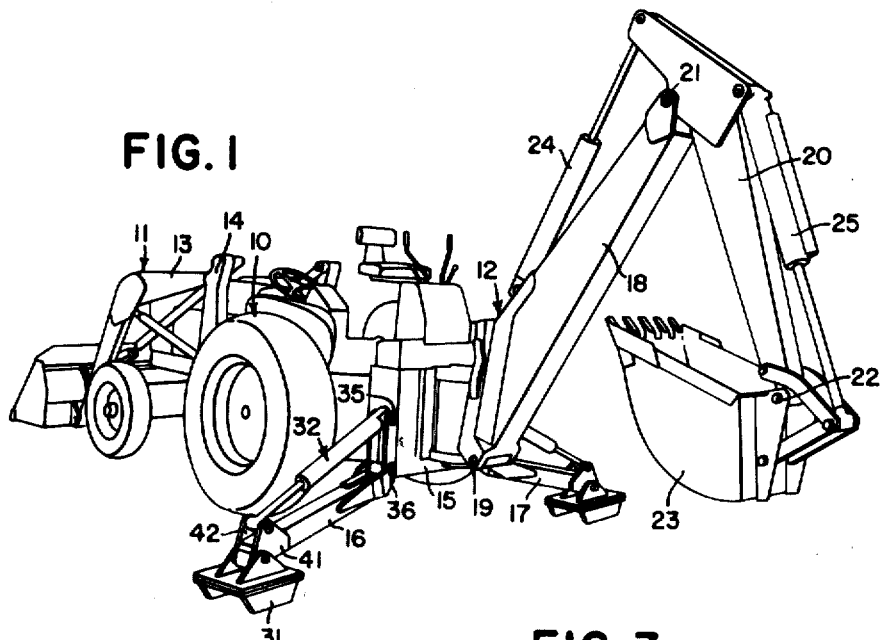
FIG. 1
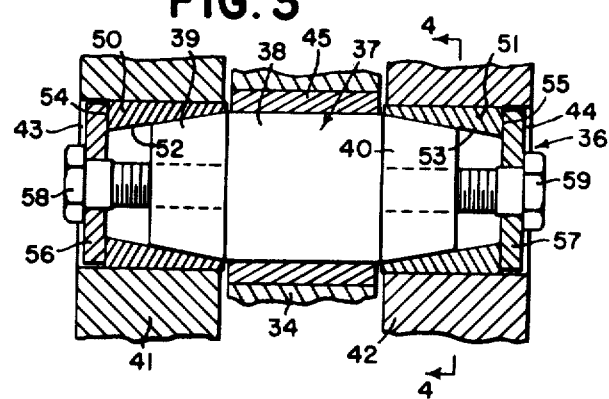
FIG. 3
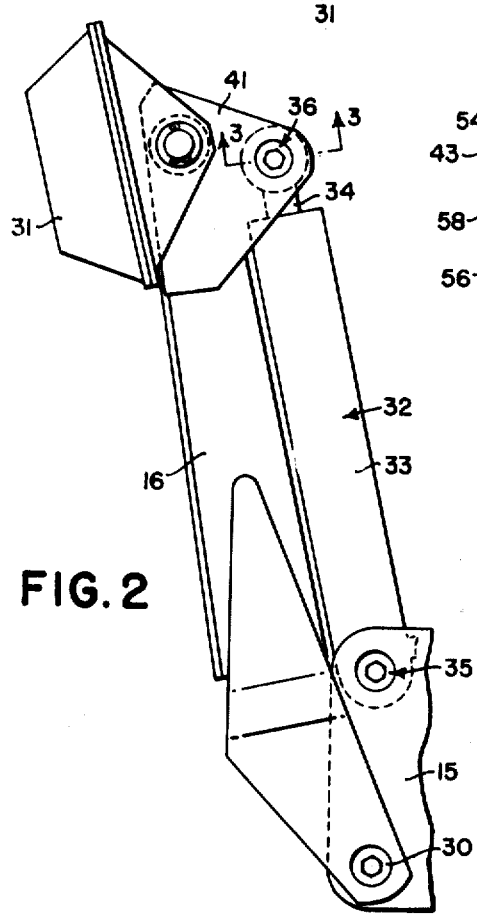
FIG. 2
FIG. 4
INVENTOR
LARRY G. MCMULLEN
BY William A. Murray
ATTORNEY

PIVOT PIN STRUCTURE

CROSS-REFERENCE TO RELATED APPLICATION

This is a continuation of application Ser. No. 625,197, filed Mar. 22, 1967 for PIVOT PIN STRUCTURE and now abandoned.

BACKGROUND OF THE INVENTION

The present invention relates to a pivot pin structure and to a pair of sleeves that is wedged between the ends of the pin and the supporting structure so that the pin is held against movement in regard to that structure.

There has been considerable work done on wedges that bear against sleeves in order to hold the sleeve against relative movement to a support or member. Such is available, for example, in Canadian Pat. No 558,343 that issued June 3, 1958, U.S. Pat No. 827,346, and German Pat. No. 1,110,476. These patents are in the general field of the present invention but do not suggest or solve the problem in the unique manner of the present invention.

SUMMARY OF THE INVENTION

It is the primary object of the present invention to provide a pivot pin structure adapted to be inserted in and to interconnect two movable parts, one of which is bifurcated and the other of which fits between the bifurcated portions. A pivot pin extends through both members and the pin is characterized by having a central journal portion and opposite tapered ends that are disposed within the bifurcated portions. A pair of split sleeves having frustoconical inner surfaces is disposed between the tapered ends of the pin and the edges of the openings of the bifurcated portions. Ends of the sleeves project axially beyond the ends of the pin and plates are provided adjacent the ends of the sleeves that may be tightened axially inwardly to drive the split sleeves axially and to slightly expand the sleeves. By expansion the sleeves are wedged between the ends of the pin and the edges of the openings so that the pin is locked against relative movement. The central journal portion supports the other member and consequently the member may pivot relative to the pin.

It is a further object of the invention to provide the openings in the bifurcated portions to be sufficiently large that the plates that engage the ends of the respective sleeves may be recessed within the openings. Since it is contemplated the present pin structure will be used in industrial and earth-working equipment, the recessing of the plates gives a smooth appearance to the pin structure as well as limiting the number of external portions in the members that may contact or engage obstructions in the earth-handling processes.

BRIEF DESCRIPTION OF THE DRAWINGS

FIG. 1 is a rear perspective view of a tractor and backhoe.

FIG. 2 is a rear view of a stabilizer leg for the backhoe as shown in the upper position.

FIG. 3 is an enlarged sectional view taken substantially along the line 3–3 of FIG. 2.

FIG. 4 is a sectional view taken substantially along the line 4–4 of FIG. 3.

DESCRIPTION OF THE PREFERRED EMBODIMENT

For illustrative purposes the present invention is shown as being utilized in pivotal connection on industrial equipment. The industrial equipment includes, in the present instance, a main mobile vehicle or tractor 10, a front-mounted loader 11 and a rear-mounted backhoe 12. The loader 11 is composed of a pair of lift arms 13 pivotally supported at their rear ends on upright frames or supports 14. The backhoe 12 is composed of a stabilizing stand that includes a main frame 15 and a pair of outwardly projecting stabilizer legs 16, 17. A rearwardly projecting mast 18 is pivoted at 19 to the main support 15. A dipper stick 20 is pivoted at 21 to the mainmast 18 and pivotally carries at 22 a ground-moving and carrying bucket 23. Hydraulic cylinders 24, 25 extend between the boom and dipper stick and dipper stick and bucket respectively and operate to position the dipper stick 20 and bucket 23 about the respective pivots 21, 22.

Characteristic of the various pivots such as at 21, 22 and the pivots that connect the hydraulic cylinders 24, 25 to the boom, dipper stick, and bucket is that the two parts that are being connected together do include a first member that is bifurcated to receive a second member centrally located in the bifurcated portions and connected thereto by a pivot pin. The present invention relates to the pivot pin structure that connects one of the members to the bifurcated portions of the other member. Since, therefore, the pivot pin structures are substantially identical, the present description will be limited to a single pin structure connected to the stabilizer leg 16.

The stabilizer leg 16 is connected at its inner end by a pivot pin structure 30 to the main support 15. The outer end of the leg 16 carries a ground-engaging shoe 31 at its outer end. The stabilizer leg 16 is raised and lowered by a hydraulic motor 32 that includes a cylinder 33 and ram 34. The cylinder is connected to the main support 15 by a pivot pin structure 35 and the ram end 34 is connected to the stabilizer leg 16 by a pivot pin structure 36. Referring now to FIG. 3, the pivot pin structure 36 includes a pivot pin 37 having a central cylindrical-shaped journal portion 38 and a pair of outer tapered or frustoconical-shaped end portions 39, 40 tapering respectively axially outwardly to radial end faces. The first member or stabilizer leg 16 has upwardly projecting bifurcated parts or plates 41, 42 at its outer end. The bifurcated portions 41, 42 have axially aligned cylindrical or circular openings 43, 44 in which are loosely disposed the tapered ends 39, 40 respectively. A second member in the form of a rod end 34 of the hydraulic cylinder or motor 32 is provided with a bushing 45, having a cylindrical opening coaxial with the openings in the parts 41, 42, that is journaled on the journal portion 38.

It is desired to fix the pin 37 against rotation in respect to the plates 41, 42 and for this purpose there is provided a pair of split sleeves 50, 51 having internal frustoconical surfaces 52, 53 that engage the tapered ends 39, 40. The outer surfaces of the sleeves 50, 51 are cylindrical-shaped and bear against the edges or walls of the openings 43, 44. The sleeves 50, 51 extend axially outwardly of the pin ends 39, 40 to outer annular edges or ends 54, 55.

Recessed in the openings 43, 44 and bearing against the edges or ends 54, 55 is a pair of centrally apertured plates 56, 57. The plates are free of actual contact with the ands 54, 55 but not the parts 41, 42. Bolts 58, 59 having their head ends bearing against the outer surfaces of the respective plates 56, 57 pass through the apertures in plates 56, 57 and are threadedly received in the ends 39, 40 of the pin 37. The bolts, as is obvious from viewing FIGS. 3 and 4, are on the axis of the pin 37.

In mounting the pin structure in the respective parts 34, 16, the entire assembly is loosely positioned in the respective parts for substantial proper alignment. The bolts 58, 59 are then tightened to draw the sleeves 50, 51 axially inwardly. The sleeves 50, 51 will thereby expand and tend to grip tightly both the surfaces of the openings 43, 44 and the surfaces of the conical-shaped ends 39, 40 of the pin 37 to thereby lock the pin 37 against movement in respect to the part 16. The rod 34 will be free to rotate on the journal portion 38 of the pin 37.

I claim:

1. In combination with a first member having a pair of spaced-apart generally parallel parts rigid thereon and a second member disposed between said parts, each part and the second member having disposed between said parts, each part and the second member having a cylindrical opening therethrough and said openings being coaxial, means for interconnecting the members for relative pivotal movement about the axis on which said openings are coaxial, comprising a one-piece pin having a central cylindrical section journally mounted within the second member opening and a pair of coaxially opposite end sections of frustoconical shape tapering respectively axially outwardly to end faces and loosely received respectively in the parts openings so as to leave an annular space between the inner surface of each part opening and the outer surface of the associated end section, each end section having a coaxial internally threaded bore therein extending axially inwardly from its end face, a pair of split sleeves, one received in each annular space, each sleeve having an outer cylindrical surface relatively tightly fitting the interior of the associated part opening and an inner frustoconical surface relatively tightly fitting the exterior of the associated end section of the pin, each sleeve having an annular outer edge recessed axially inwardly of the outer side of its respective part and disposed axially outwardly of the associated end face of the pin, a pair of centrally apertured plates recessed at least partially within the openings of said first member and respectively axially inwardly abutting the sleeve edges and free from axially abutting contact with the parts, and a pair of externally threaded elements passing respectively through the apertured plates and threaded respectively into said bores, each element having a headed portion axially abutting the associated plate and adapted to receive a tool for drawing the associated plate axially inwardly against its associated sleeve to increase both the internal and external gripping action of the associated sleeve on the associated pin end section and part opening, each threaded element also having a cylindrical pilot portion between the headed portion and the external threaded portion, said pilot portion being at least the width of its associated plate and slidably supporting said plate in substantially perpendicular relationship thereto.

2. The invention defined in claim 1, in which each sleeve is of one-piece C-shaped construction.

3. The invention defined in claim 1, in which the axial dimension of each part in the area of its opening is such, relative to the axial dimensions of the associated pin end section, sleeve and plate, that said part has an outer face axially beyond the plate and said part opening is of such diameter as to surround said plate.

4. The invention defined in claim 1, in which the first member is elongated and has a bifurcated portion of which said parts comprise the furcations in the form of ears extending outwardly from the member to terminal ends in which said part openings are formed.

UNITED STATES PATENT OFFICE
CERTIFICATE OF CORRECTION

Patent No. 3,600,015    Dated 17 August 1971

Inventor(s) Larry Gene McMullen

It is certified that error appears in the above-identified patent and that said Letters Patent are hereby corrected as shown below:

Column 2, lines 67-68, cancel "disposed between . . . member having".

Signed and sealed this 29th day of February 1972.

(SEAL)
Attest:

EDWARD M. FLETCHER, JR.
Attesting Officer

ROBERT GOTTSCHALK
Commissioner of Patents